United States Patent
Xiong et al.

(10) Patent No.: US 10,841,910 B2
(45) Date of Patent: Nov. 17, 2020

(54) PHYSICAL DOWNLINK CONTROL CHANNEL FOR FIFTH-GENERATION NETWORKS

(71) Applicant: Intel IP Corporation, Santa Clara, CA (US)

(72) Inventors: Gang Xiong, Beaverton, OR (US); Jong-Kae Fwu, Sunnyvale, CA (US); Yuan Zhu, Beijing (CN); Ralf Matthias Bendlin, Portland, OR (US); Yushu Zhang, Beijing (CN); Huaning Niu, Milpitas, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/568,746

(22) PCT Filed: Dec. 10, 2015

(86) PCT No.: PCT/US2015/065093
§ 371 (c)(1),
(2) Date: Oct. 23, 2017

(87) PCT Pub. No.: WO2016/186699
PCT Pub. Date: Nov. 24, 2016

(65) Prior Publication Data
US 2018/0152923 A1     May 31, 2018

Related U.S. Application Data

(60) Provisional application No. 62/165,115, filed on May 21, 2015.

(51) Int. Cl.
*H04W 72/04*     (2009.01)
*H04J 11/00*     (2006.01)
(Continued)

(52) U.S. Cl.
CPC ............ *H04W 72/042* (2013.01); *H04B 7/00* (2013.01); *H04J 3/16* (2013.01); *H04J 11/00* (2013.01);
(Continued)

(58) Field of Classification Search
CPC ............... H04W 72/042; H04W 88/02; H04W 72/0446; H04L 5/0094; H04L 5/0044;
(Continued)

(56) References Cited

U.S. PATENT DOCUMENTS 8,009,617 B2    8/2011    Sarkar et al.
9,198,181 B2 *   11/2015   Blankenship ....... H04W 72/042
(Continued)

FOREIGN PATENT DOCUMENTS

CN     102123503     7/2011
CN     102281636     12/2011
(Continued)

OTHER PUBLICATIONS

Ericsson, EPDCCH initialization for MTC, 3GPP TSG RAN WG1 Meeting #81, Fukuoka, Japan, May 25-29, 2015, R1-152501. (Year: 2015).*
(Continued)

*Primary Examiner* — Shailendra Kumar
(74) *Attorney, Agent, or Firm* — Schwegman Lundberg & Woessner, P.A.

(57) ABSTRACT

Disclosed herein are apparatuses, systems, and methods using or implementing a control channel (PDCCH) design. The PDCCH can occupy an initial number of OFDM symbols of a downlink subframe, while occupying less than the full system bandwidth. The PDCCH can be time division multiplexed (TDM) with a shared channel (PDSCH) or frequency division multiplexed (FDM) with a PDSCH. The PDCCH can further be multiplexed with another PDCCH in
(Continued)

a contiguous or non-contiguous region. Resources allocated to the PDCCH can overlap or partially overlap resources allocated to the PDSCH. An Evolved Node-B (eNB) can provide configuration information for the PDCCH design in Radio Resource Control (RRC) signaling to a user equipment (UE), or through use of a Master Information Block (MIB) or System Information Block (SIB).

3 Claims, 14 Drawing Sheets

(51) Int. Cl.
| | | |
|---|---|---|
| H04J 3/16 | (2006.01) | |
| H04L 5/00 | (2006.01) | |
| H04B 7/00 | (2006.01) | |
| H04B 7/06 | (2006.01) | |
| H04L 27/26 | (2006.01) | |
| H04W 88/02 | (2009.01) | |

(52) U.S. Cl.
CPC .......... *H04L 5/0037* (2013.01); *H04L 5/0044* (2013.01); *H04L 5/0053* (2013.01); *H04L 5/0094* (2013.01); *H04W 72/0446* (2013.01); *H04B 7/0617* (2013.01); *H04L 5/0023* (2013.01); *H04L 5/0051* (2013.01); *H04L 5/0082* (2013.01); *H04L 27/2602* (2013.01); *H04W 88/02* (2013.01)

(58) Field of Classification Search
CPC ... H04L 5/0037; H04L 5/0053; H04L 5/0051; H04L 27/2602; H04L 5/0082; H04L 5/0023; H04B 7/00; H04B 7/0617; H04J 3/16; H04J 11/00
See application file for complete search history.

(56) References Cited

U.S. PATENT DOCUMENTS

| | | | | |
|---|---|---|---|---|
| 2009/0046582 A1* | 2/2009 | Sarkar | ............... | H04L 25/03343 370/230.1 |
| 2012/0027111 A1* | 2/2012 | Vook | .................... | H04B 7/0452 375/267 |
| 2013/0100900 A1* | 4/2013 | Lee | ......................... | H04W 4/70 370/329 |
| 2013/0301561 A1* | 11/2013 | Sartori | ................. | H04L 5/0053 370/329 |
| 2014/0153452 A1* | 6/2014 | Son | ........................ | H04L 5/001 370/280 |
| 2014/0204849 A1* | 7/2014 | Chen | ..................... | H04L 5/0053 370/329 |
| 2014/0269594 A1* | 9/2014 | Jang | ...................... | H04L 5/0053 370/329 |
| 2016/0128033 A1* | 5/2016 | Larsson | ............ | H04W 72/0453 370/329 |
| 2016/0302175 A1* | 10/2016 | Blankenship | ....... | H04W 72/042 |
| 2018/0007709 A1* | 1/2018 | Seo | ......................... | H04L 5/001 |

FOREIGN PATENT DOCUMENTS

| | | |
|---|---|---|
| CN | 104619025 | 5/2015 |
| CN | 107548539 A | 1/2018 |
| EP | 2738965 A2 | 6/2014 |
| WO | WO-2016186699 A1 | 11/2016 |

OTHER PUBLICATIONS

NTT DOCOMO, Time and Frequency Relationship for MPDSCH and PDSCH, 3GPP TSG RAN WG1 Meeting #81, Fukuoka, Japan, May 25-29, 2015, R1-153320. (Year: 2015).*
Ericsson et al., 3GPP TSG RAN WG1 #80bis v0.2.0, (Belgrade, Serbia, Apr. 20-24, 2015, R1-152367 (Year: 2015).*
MCC Support, Draft Report of 3GPP TSG RAN WG1 #80bis v0.2.0, (Belgrade, Serbia, Apr. 20-24, 2015), May 14, 2015, R1-15xxxx (Year: 2015).*
MCC Support, Final Report of 3GPP TSG RAN WG1 #80bis v0.2.0, (Belgrade, Serbia, Apr. 20-24, 2015), May 14, 2015, R1-152431 (Year: 2015).*
"EPDCCH initialization for MTC", EPDCCH initialization for MTC Meeting #81, Ericsson, May 16, 2015), 1-6 pgs.
"International Application Serial No. PCT/US2015/065093, International Search Report dated Apr. 25, 2016", 3 pgs.
"International Application Serial No. PCT/US2015/065093, Written Opinion dated Apr. 25, 2016", 11 pgs.
"Time and Frequency Relationship for MPDSCH and PDSCH", R1-153320, 3GPP TSG RAN WG1 Meeting #81, (May 16, 2015), 1-6 pgs.
"European Application Serial No. 15892793.9, Extended European Search Report dated Dec. 6, 2018", 12 pgs.
"European Application Serial No. 15892793,9, Response filed Jun. 18, 2019 to Extended European Search Report dated Dec. 6, 2018", 22 pgs.
"Chinese Application Serial No. 201580079612.7, Office Action dated Jun. 3, 2020", w English Translation, 20 pgs.
"European Application Serial No. 15892793.9, Response filed May 25, 2020 to Communication Pursuant to Article 94(3) EPC dated Jan. 16, 2020", 13 pgs.
"European Application Serial No. 15892793.9, Communication Pursuant to Article 94(3) EPC dated Jan. 16, 2020", 6 pgs.

* cited by examiner

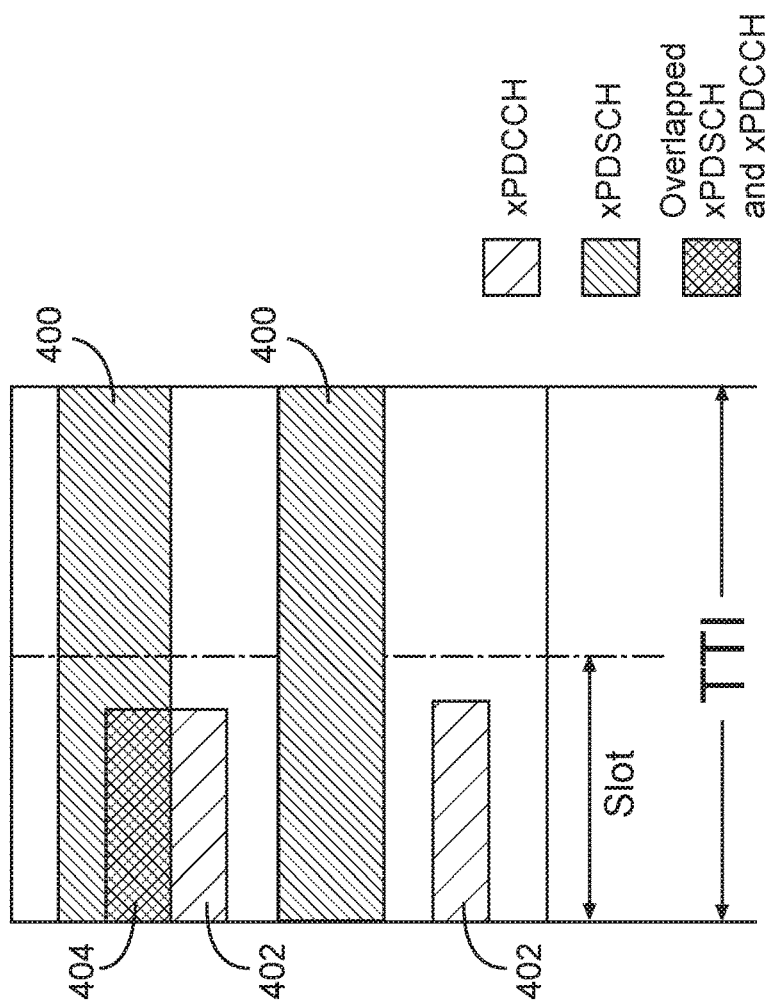
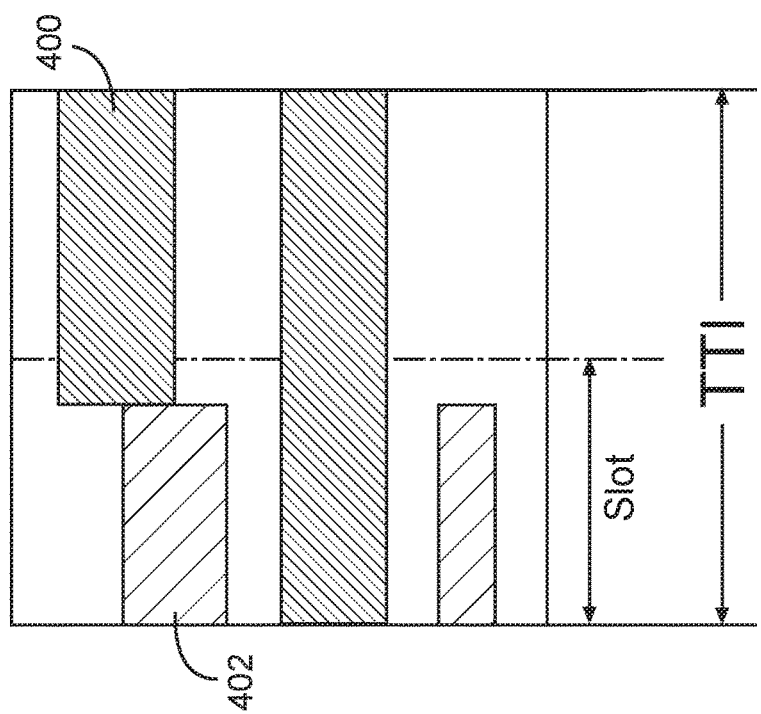
Fig. 4A
Fig. 4B

Fig. 8

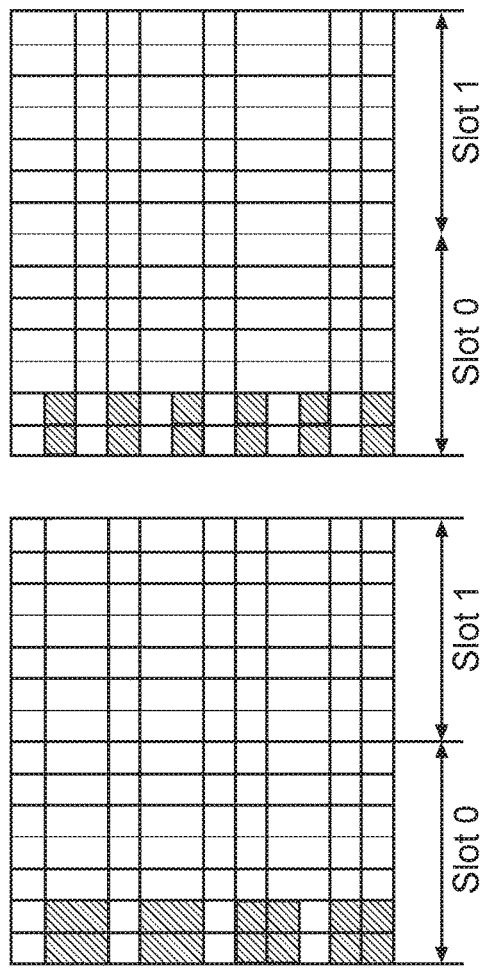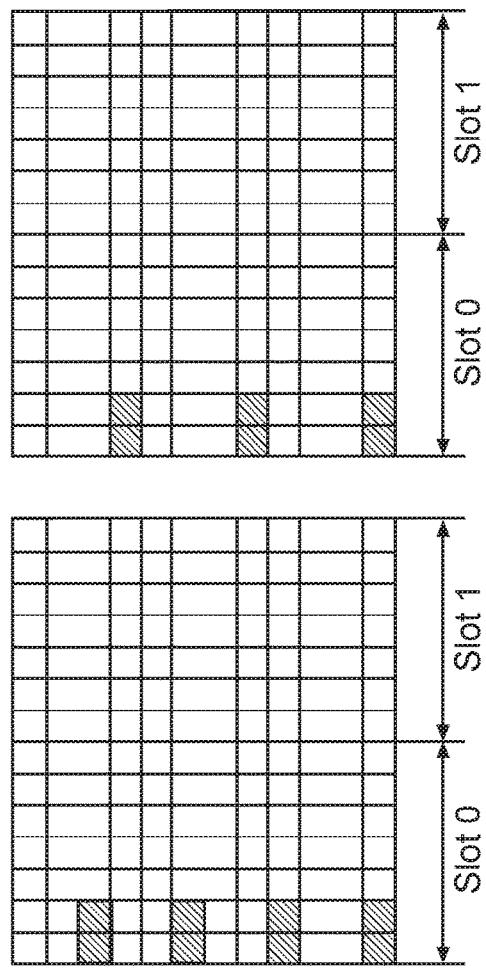
Fig. 12A  Fig. 12B  Fig. 12C  Fig. 12D  Fig. 12E

US 10,841,910 B2

PHYSICAL DOWNLINK CONTROL CHANNEL FOR FIFTH-GENERATION NETWORKS

CLAIM OF PRIORITY

This patent application is a U.S. National Stage Application under 35 U.S.C. 371 from International Application No. PCT/US2015/065093, filed Dec. 10, 2015, now published as WO 2016/186699 A1, each of which claims the benefit of priority from U.S. Provisional Patent Application No. 62/165,115, filed May 21, 2015, entitled "A NOVEL PHYSICAL DOWNLINK CONTROL CHANNEL DESIGN FOR 5G", and each of the applications PCT/US2015/065093 and 62/165,115 is incorporated by reference herein in its entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, and 3GPP LTE-A (LTE Advanced) networks, although the scope of embodiments is not limited in this respect. Some embodiments pertain to 5G communications. Some embodiments relate to control channel design.

BACKGROUND

Control channels transmit control information to users in wireless communication networks. Control channels include sufficient resources to transmit control information to a wide variety of narrowband and wideband devices, while maintaining the flexibility to support dynamic allocation of sub-bands for different applications and services. The design of control channels has been an ongoing process.

BRIEF DESCRIPTION OF THE DRAWINGS

FIGS. 4A and 4B illustrate schemes for multiplexing a proposed PDCCH and a physical downlink shared channel (PDSCH) in accordance with some embodiments;

FIG. 8 illustrates resource mapping for the first DM-RS pattern in accordance with various embodiments;

FIGS. 12A-12E illustrates still further example DM-RS patterns in accordance with various embodiments;

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

Figure 1:
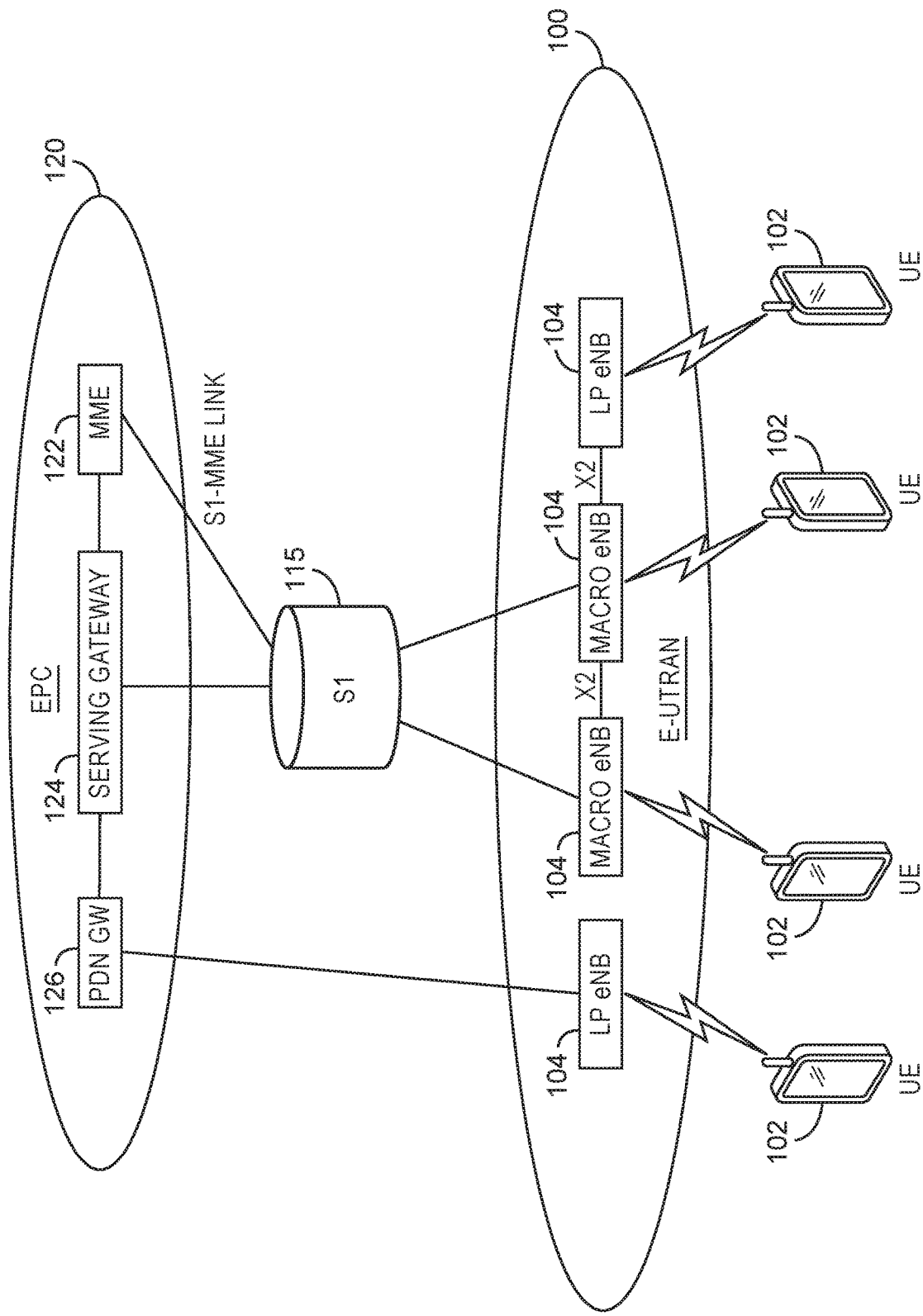
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which can operate as base stations) for communicating with User Equipment (UE) 102. The eNBs 104 can include macro eNBs and low power (LP) eNBs. In accordance with some embodiments, the eNB 104 can receive uplink data packets from the UE 102 on a Radio Resource Control (RRC) connection between the eNB 104 and the UE 102. The eNB 104 can transmit an RRC connection release message to the UE 102 to indicate a transition of the UE 102 to an RRC idle mode for the RRC connection. The eNB 104 can further receive additional uplink data packets according to the stored context information.

The MME 122 manages mobility aspects in access such as gateway selection and tracking area list management. The serving GW 124 terminates the interface toward the RAN 10, and routes data packets between the RAN 100 and the core network 120. In addition, it can be a local mobility anchor point for inter-eNB handovers and also can provide an anchor for inter-3GPP mobility. Other responsibilities may include lawful intercept, charging, and some policy enforcement. The serving GW 124 and the MME 122 can be implemented in one physical node or separate physical nodes. The PDN GW 126 terminates an SGi interface toward the packet data network (PDN). The PDN GW 126 routes data packets between the EPC 120 and the external PDN, and can be a key node for policy enforcement and charging data collection. It can also provide an anchor point for mobility with non-LTE accesses. The external PDN can be any kind of IP network, as well as an IP Multimedia Subsystem (IMS) domain. The PDN GW 126 and the serving GW 124 can be implemented in one physical node or separated physical nodes. Furthermore, the MME 122 and the Serving GW 124 can be collapsed into one physical node in which case the messages will need to be transferred with one less hop.

The eNBs 104 (macro and micro) terminate the air interface protocol and can be the first point of contact for a UE 102. In some embodiments, an eNB 104 can fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 can be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals can comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB can be implemented with a picocell eNB since it is coupled to a macro eNB via an X2 interface. Picocell eNBs or other LP eNBs can incorporate some or all functionality of a macro eNB. In some cases, this can be referred to as an access point base station or enterprise femtocell.

In some embodiments, a downlink resource grid can be used for downlink transmissions from an eNB 104 to a UE 102, while uplink transmission from the UE 102 to the eNB 104 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The network frame structure and particular frame information (e.g., frame number) can depend on the Radio Access Technology (RAT) being used by the UE to connect with the network. For example, communication over an LTE network can be divided into 10 ms frames, each of which can contain ten 1 ms subframes. Each subframe of the frame, in turn, can contain two slots of 0.5 ms.

The smallest time-frequency unit in a resource grid is denoted as a resource element (RE). Each resource grid comprises a number of resource blocks (RBs), which describe the mapping of certain physical channels to resource elements. Each resource block comprises a collection of resource elements and in the frequency domain and can represent the smallest quanta of resources that currently can be allocated. There are several different physical downlink channels that are conveyed using such resource blocks. With particular relevance to this disclosure, two of these physical downlink channels are the physical downlink shared channel and the physical downlink control channel. The design of these channels, particularly the physical downlink control channel, has been an ongoing process.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. An enhanced PDCCH (ePDCCH) is also provided in some revisions of the 3GPP LTE.

Figure 2:
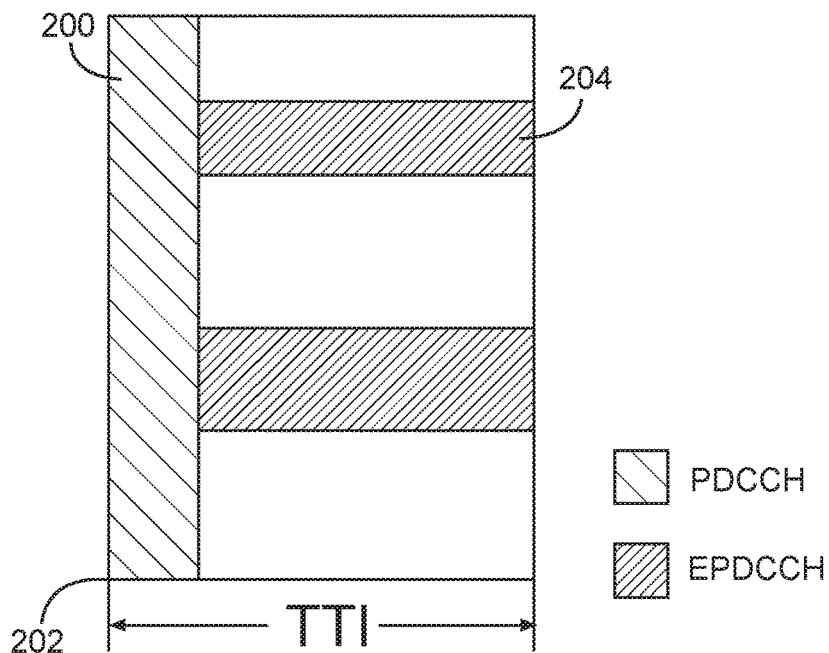
FIG. 2 illustrates a physical downlink control channel (PDCCH) and enhanced PDCCH (ePDCCH) in accordance with 3GPP LTE specifications.

FIG. 2 illustrates a PDCCH and ePDCCH in accordance with 3GPP LTE specifications. A legacy PDCCH 200 spans up to three OFDM symbols (or four OFDM symbols if the system bandwidth is 1.4 MHz) at the start 202 of a subframe. Multiple PDCCHs can be transmitted in a downlink control region of a subframe. Given that the PDCCH 200 can only occupy up to three or four OFDM symbols in a subframe, a limited number of Downlink Control Information (DCI) messages can be transmitted per subframe, which can limit the capacity of the control channel. The problem becomes even more pronounced with support of cross carrier scheduling in systems that support carrier aggregation (CA). Additionally, because the PDCCH 200 occupies the full system bandwidth, systems can be unable to flexibly support dynamic allocation of sub-band for different applications and services. For instance, in 3GPP LTE Rel-13, a machine type communication (MTC) region (not shown in FIG. 2) is defined after the legacy PDCCH region 200 to provide coexistence of legacy LTE UEs and low cost MTC devices with 1.4 MHz system bandwidth.

To overcome the limitation of PDCCH, 3GPP LTE Rel. 11 introduced ePDCCH 204 to increase the control channel capacity. In order to coexist on the same carrier with legacy UEs and to prevent interference with legacy control channels (e.g., PDCCH 200), the ePDCCH 204 is transmitted after the legacy PDCCH 200 control region. Further, ePDCCH and PDSCH are multiplexed in a frequency-division multiplexing (FDM) manner (not shown in FIG. 2) to minimize the interference to data channel transmission. The FDM based multiplexing scheme can also allow frequency-selective scheduling based on the channel state information (CSI) feedback from a UE, thereby leading to superior performance for ePDCCH.

However, one of the drawbacks for ePDCCH is reduced processing time budget for PDSCH decoding. Given that ePDCCH 204 spans the remaining symbols in one subframe after the PDCCH region 200, a UE device would typically have to wait several hundred microseconds after the end of the subframe to complete the ePDCCH decoding, giving less time for PDSCH decoding and generation of the hybrid automatic repeat request acknowledgment (HARQ-ACK) feedback.

To overcome these and other shortcomings, embodiments provide a design for PDCCH for systems that follows a design principle of mixed TDM and FDM mode, which can exploit the benefits using TDM (similar to PDCCH) and FDM (similar to ePDCCH) multiplexing schemes.

Proposed xPDCCH Design

Figure 3:
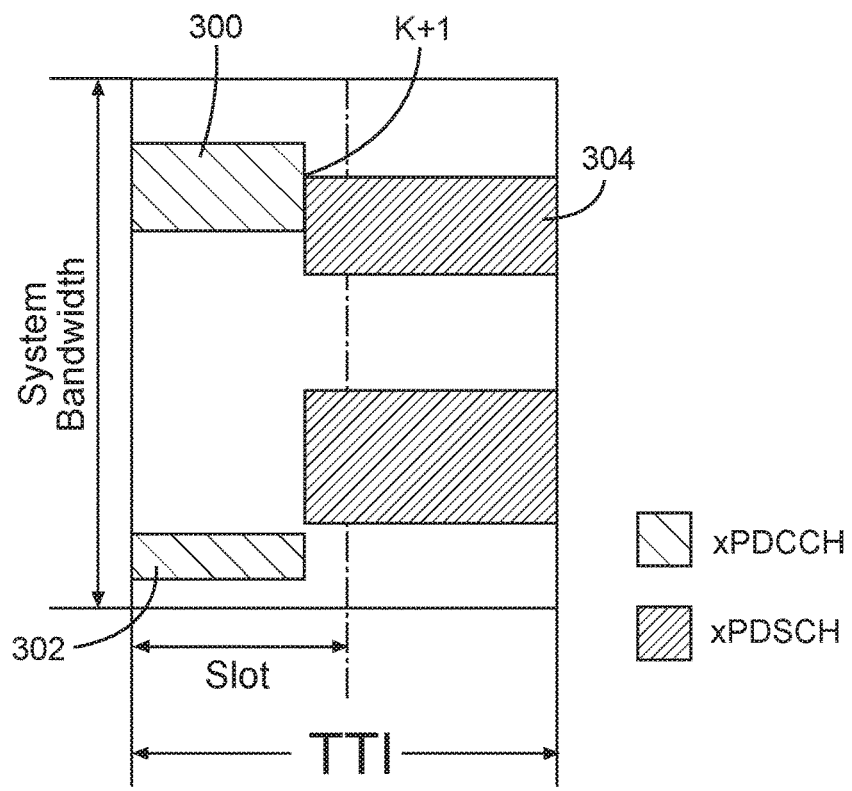
FIG. 3 illustrates a proposed PDCCH design in accordance with some embodiments.

FIG. 3 illustrates a proposed PDCCH (e.g., an "xPDCCH") design in accordance with some embodiments. More specifically, xPDCCH 300 spans an initial number of OFDM symbols within one transmission time interval (TTI), and occupies N PRBs within the system bandwidth, wherein N is less than the number of PRBs within the system bandwidth). In the frequency domain, contiguous or non-contiguous resources can be allocated for xPDCCH, for example, a second xPDCCH region 302 can be non-contiguous with xPDCCH 300.

Systems and apparatuses in accordance with various embodiments, can transmit xPDCCH in localized mode or in distributed mode. Localized transmission of xPDCCH can allow closed-loop frequency dependent scheduling, for enhanced or improved performance. Distributed transmission of xPDCCH can exploit benefits of frequency diversity, which, among other features, can enhance or facilitate scheduling of common control messages for a group of UEs in a network.

Embodiments can assist operators in improving the processing budget for physical downlink shared channel (xPDSCH) decoding. Embodiments allow dynamic allocation of sub-bands for various applications and partitions, and embodiments support frequency-selective scheduling, and frequency domain inter-cell interference cancellation (ICIC). Operators can further experience more efficient support of MU-MIMO to increase the control channel capacity.

Referring again to FIG. 3, in embodiments, the shared channel 304 can be transmitted after the control region (e.g., from the K+1 symbol, where K is the number of symbols in the control region). In an example embodiment, the control channel spans the first slot within the TTI, which enables cross-slot scheduling for the shared channel.

In another embodiment, the xPDSCH can span a full subframe. FIGS. 4A and 4B illustrate schemes for multiplexing a proposed PDCCH and a physical downlink shared channel (PDSCH) in accordance with some embodiments.

Referring to FIG. 4A, the xPDSCH 400 can be transmitted on PRBs which are not occupied by the xPDCCH 402 transmission. In another example as shown in FIG. 4B, the xPDSCH 400 can be partially or fully overlapped with the xPDCCH 402. If the xPDCCH 402 is associated with the xPDSCH 400 with which it overlaps, the xPDSCH 400 is not mapped to REs carrying the associated xPDCCH 402. Rather, the xPDSCH 400 is rate matched around these resources. If the xPDSCH 400 is semi-persistently scheduled without a corresponding xPDCCH 402, a UE (e.g., UE 102, FIG. 1) can continue to rate match around the resources 404 to allow a scheduler at the eNB (e.g., the eNB 104, FIG. 1) to dynamically transmit the xPDCCH 402 in these resources 404 to other UEs. Alternatively, the xPDSCH 400 will not be rate matched when the xPDSCH 400 is semi-persistently scheduled without a corresponding xPDCCH 402.

The configuration information for the xPDCCH can be included in DCI messages or signaled via UE-specific dedicated RRC signaling. However, the size of DCI messages can become overly large, resulting in reduced or worsened performance.

In another embodiment, xPDSCH is scheduled to be transmitted in a subsequent subframe (e.g., the next subframe) after which xPDCCH was transmitted. This cross-subframe scheduling may pose certain constraints on the processing time for xPDSCH decoding. This issue can be resolved by extending the HARQ timing. For example, the gap between xPDCCH and ACK/NACK feedback can be extended from 4 subframes to 5 subframes.

An eNB (e.g., eNB 104) or other network-side entity can configure xPDCCH by providing various parameters to user devices (e.g., UE 102). The configurations of xPDCCH transmission resources can be independent for the common search space and the UE-specific search space. These parameters can include, in various embodiments, time domain information, frequency domain information, or any combination thereof. Time domain information can include the number of OFDM symbols (K) provided for xPDCCH, or a bitmap specifying whether the xPDCCH is configured to be transmitted in the corresponding subframe, and this pattern of xPDCCH can be repeated with a periodicity. As an example, given a parameter subframeBitMap="0011000011" xPDCCH transmission will occur at subframe 2, 3, 8 and 9, in each frame.

Frequency domain information can include the PRB index and information regarding localized or distributed mode. The resource or PRB index can be configured in a contiguous or non-contiguous manner. Additionally, one UE can be configured with one or more transmission modes. For example, one UE 102 can be configured with 2 localized transmission modes, a second UE 102 can be configured with 1 localized mode and 1 distributed mode, and a third UE 102 can be configured with 1 distributed mode.

In one embodiment, xPDCCH can be transmitted using PRB bundling, to improve the channel estimation performance. More specifically, when PRB bundling is employed, the same beamforming weight is applied on the bundled PRBs for the transmission of the xPDCCH. When the xPDCCH and the xPDSCH for the same UE exists in different PRBs of the same PRB bundling, PRB bundling can be applied to improve the channel estimation performance of xPDCCH and xPDSCH. The PRB bundling size can be predefined by 3GPP specification, or configured by a higher layer. Further, the PRB bundling size can be determined based on the system bandwidth. If PRB bundling is applied, the eNB 104 can specify or configure the bundled PRB index in the frequency domain.

In some embodiments, the resource allocation for the transmission of xPDCCH can be predefined. For example, the number of OFDM symbols (K) used for the transmission of xPDCCH can be predefined in the specification. In another example, xPDCCH can be allocated at the edge of the system bandwidth, thereby exploiting key benefits of frequency diversity. At least these embodiments may be used when the xPDCCH is used to schedule common control messages, (e.g., SIB, paging, and random access response (RAR) messages).

In some embodiments, the resource allocation for the transmission of xPDCCH can be configured in the master information block (MIB) or a system information block (SIB0. In one example, the resource allocation configuration for xPDCCH used to schedule the SIB1 transmission is indicated in the MIB, and that for xPDCCH used to schedule other SIB transmission can be indicated in the SIB1. As a further example, the resource allocation for the xPDCCH used to schedule paging/RAR transmission can be indicated in the SIB2. However, embodiments are not limited to usage of any particular SIB for indicating xPDCCH allocations.

In some embodiments, the resource allocation for the transmission of xPDCCH can be configured via UE-specific dedicated signaling. These embodiments can also be applied in carrier aggregation use cases, wherein the xPDCCH resource allocation at the secondary cell (SCell) can be configured in the UE-specific RRC signaling from the primary cell (PCell). In still other embodiments, the xPDCCH resource allocation can be indicated in a dedicated channel or signal. For example, the number of OFDM symbols (K) used for the transmission of xPDCCH can be indicated via Physical Control Format Indicator channel (PCFICH) as defined by 3GPP specifications.

In some embodiments, the xPDCCH resource allocation for common control messages may be transparent between eNB and UE without any definition. The PRB starting index for common control message may be obtained based on a hash function which depends on the cell ID and subframe index, so that the inter-cell interference for the common control message may be reduced. An active UE may search the common control message from a corresponding xPDCCH in each subframe.

In some embodiments, the resource allocation for the transmission of xPDCCH may be defined by the PDSCH message with a control element indicating the xPDCCH resource index, which may define the PRB starting index, bundling size and scramble ID in Demodulation reference symbol (DM-RS). In another embodiment, the resource allocation for the transmission of xPDCCH may depend on the subframe. For example, the network can configure a subset of subframes for Multimedia Broadcast/Multicast Services (MBMS). In these subframes, the eNB 104 can transmit multicast data to a plurality of users. In order to allow scheduling of downlink or uplink transmissions in subsequent subframes, the system bandwidth can be divided into a MBMS region and a non-MBMS region. In order to not fragment the MBMS region, the non-MBMS region may be at either or both edges of the system bandwidth. xPDCCH transmission can occur in MBMS-dedicated subframes in the non-MBMS region to transmit uplink grants or downlink grants for cross-subframe scheduled xPDSCH transmissions. In addition, if the eNB does not transmit MBMS data in the MBMS region of an MBMS dedicated subframe, the eNB can dynamically use an xPDCCH transmitted in the non-MBMS region to schedule xPDSCH transmissions in the MBMS region of the same subframe. This avoids blind detection of an xPDCCH in the MBMS region. Accordingly, the DCI carried on the xPDCCH in the non-MBMS region must convey to the UE if the grant applies to the MBMS-region in the current subframe or if the grant is a cross-subframe scheduling grant. In one embodiment, the DCI contains a flag indicating whether the grant applies to the current or a subsequent subframe. In another embodiment a new DCI format is transmitted on the xPDCCH in the non-MBMS region to schedule xPDSCH in the MBMS-region of the same subframe.

Variants on the xPDCCH Design

Figures 5A, 5B:
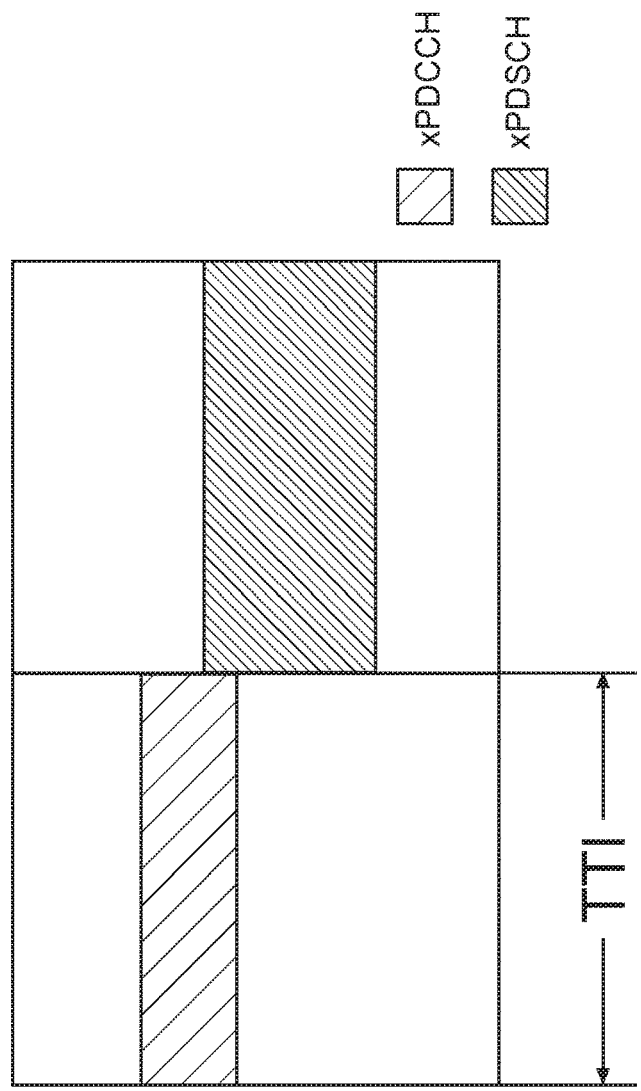
FIGS. 5A and 5B illustrate frequency division multiplexing (FDM) of a proposed PDCCH design and a PDSCH in accordance with some embodiments.

Various xPDCCH configurations and allocations can be provided, as will be described in further detail below. For example, in at least some embodiments illustrated in FIGS. 5A and 5B, xPDCCH spans one full subframe and the xPDCCH and xPDSCH are multiplexed in a FDM manner. As described earlier herein, xPDSCH can be transmitted in different PRBs from the xPDCCH (FIG. 5A) or xPDSCH can be partially or fully overlapped with xPDCCH transmission. Further, cross-subframe scheduling may be applied to reduce the IQ buffer size as shown in FIG. 5B.

Figure 6B:
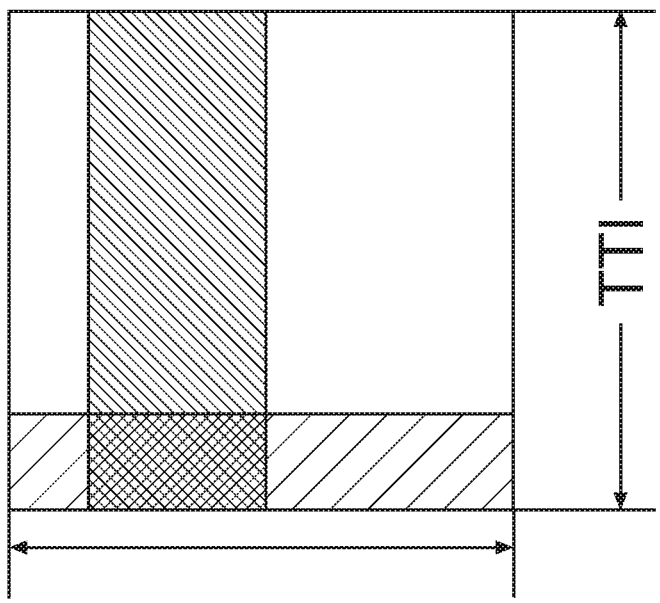
FIGS. 6A and 6B illustrates time division multiplexing (TDM) of a proposed PDCCH design and a PDSCH in accordance with some embodiments.
Figure 6A:
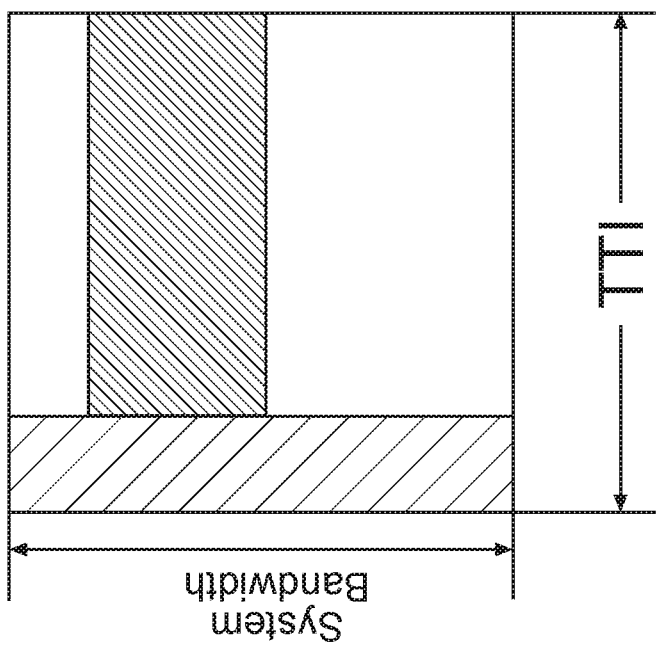

In other embodiments, shown in FIGS. 6A and 6B, xPDCCH spans the first K OFDM symbols within one TTI, and occupies the full system bandwidth. Further, the xPDCCH and xPDSCH are multiplexed in a TDM manner. As described earlier herein, xPDSCH can be transmitted after the xPDCCH region as shown in FIG. 5A or xPDSCH can be partially overlapped with the transmission of xPDCCH as shown in FIG. 5B Further, cross-subframe scheduling may be applied.

Resource Mapping for xPDCCH

In current LTE specifications, an ePDCCH is transmitted using one or more enhanced control channel element (eCCE)s, where an eCCE includes four or eight enhanced resource element group (eREG)s. There are 16 eREGs in a PRB pair, where each eREG typically includes nine resource elements (RE)s.

In FDM-based embodiments or in mixed TDM/FDM embodiments described earlier herein, resource mapping of xPDCCH can be implemented in various ways. In various embodiments, proposed REG (e.g., "xREG") can be defined based on a DM-RS pattern.

Figure 7:
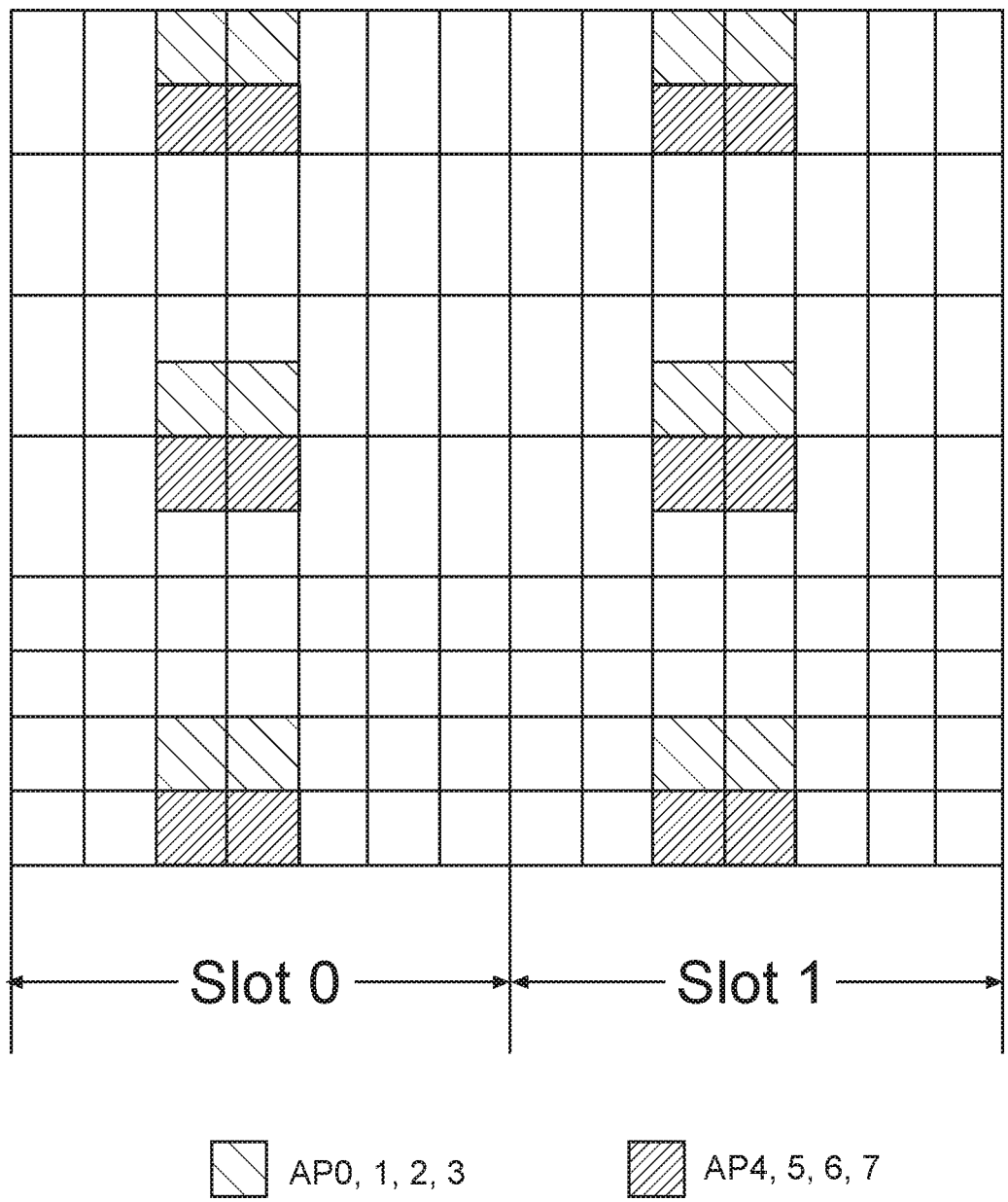
FIG. 7 illustrates a first example Demodulation Reference Symbol (DM-RS) pattern for transmission of a proposed PDCCH design in accordance with some embodiments.
Figure 8:
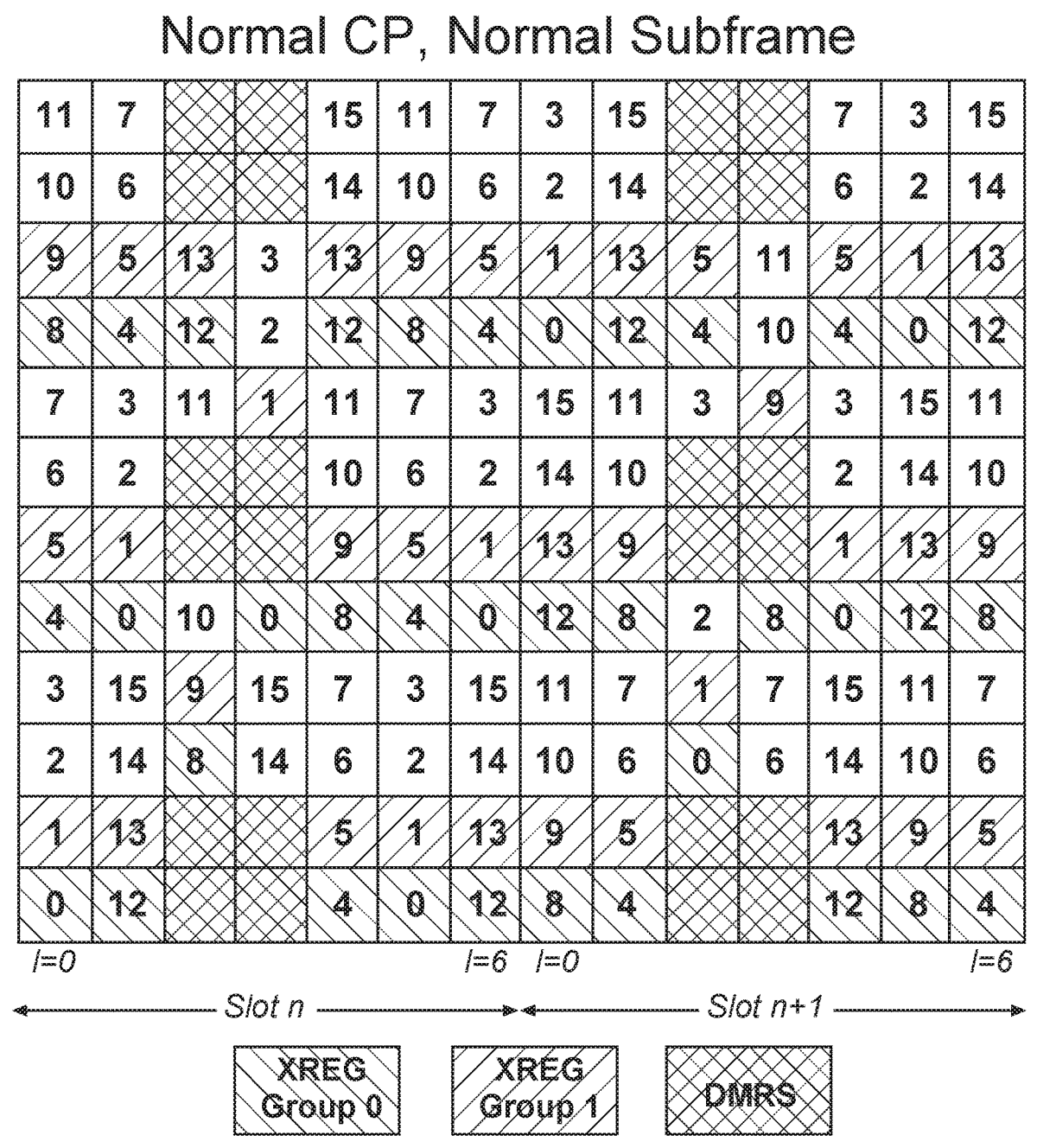

FIG. 7 illustrates a first example DM-RS pattern for transmission of xPDCCH in accordance with some embodiments. In the illustrated example, the DM-RS is transmitted in the OFDM symbol #2 and #3 in each slot within one TTI. Based on the DM-RS pattern shown in FIG. 7, resource mapping of the xREG and xREG group can be defined as shown in FIG. 8. Note that the xREG indices are sequentially mapped to REs first in a frequency manner, and then in a time manner within one PRB pair, excluding the DM-RS. 16 xREGs (numbered 0-16 in FIG. 8) are defined (this is similar to current LTE specifications defining 16 REGs), where each xREG consists of 9 REs within one PRB pair. 4 xREG groups are further defined, where each xREG group consists of 4 xREGs.

The resource mapping of xREG group can be defined as follows (xREG groups #0 and 1 are illustrated in FIG. 8): xREG group #0 {xREG #0, 4, 8, 12}; xREG group #1 {xREG #1, 5, 9, 13}; xREG group #2 {xREG #2, 6, 10, 14}; and xREG group #3 {xREG #3, 7, 11, 15}.

xCCE may consist of either 4 or 8 xREGs depending on the available REs allocated for the xPDCCH transmission. In the case where xPDCCH follows the design principle of a mixed TDM and FDM mode (as shown in FIG. 3), xCCE may consist of 8 xREGs or 2 xREG groups. For instance, one xCCE may combine xREG group #0 and #2 while another xCCE may combine xREG group #1 and #3.

If xPDCCH spans a full subframe as shown in FIGS. 5A and 5B, xCCE may consist of 4 xREGs or 1 xREG group. For instance, xCCE #0 may use xREG group #0; xCCE #1 may use xREG group #1; xCCE #2 may use xREG group #2 and xCCE #3 may use xREG group #3.

Figure 9:
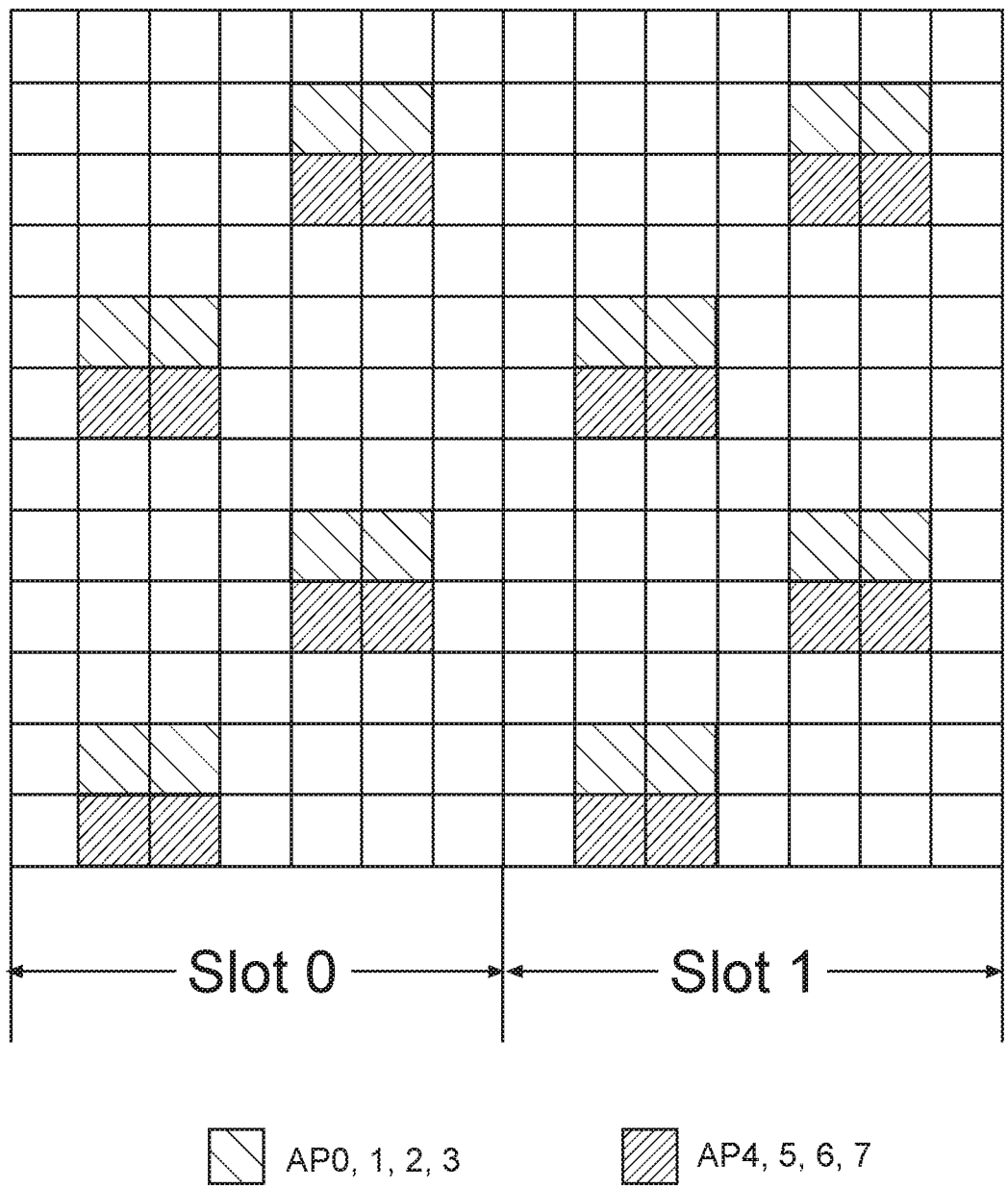
FIG. 9 illustrates a second example DM-RS pattern for transmission of a proposed PDCCH design in accordance with various embodiments.

In another example, the DM-RS pattern follows a scattered structure, which can provide near-optimal channel estimation performance. FIG. 9 illustrates the DM-RS pattern according to at least these embodiments.

Figure 10:
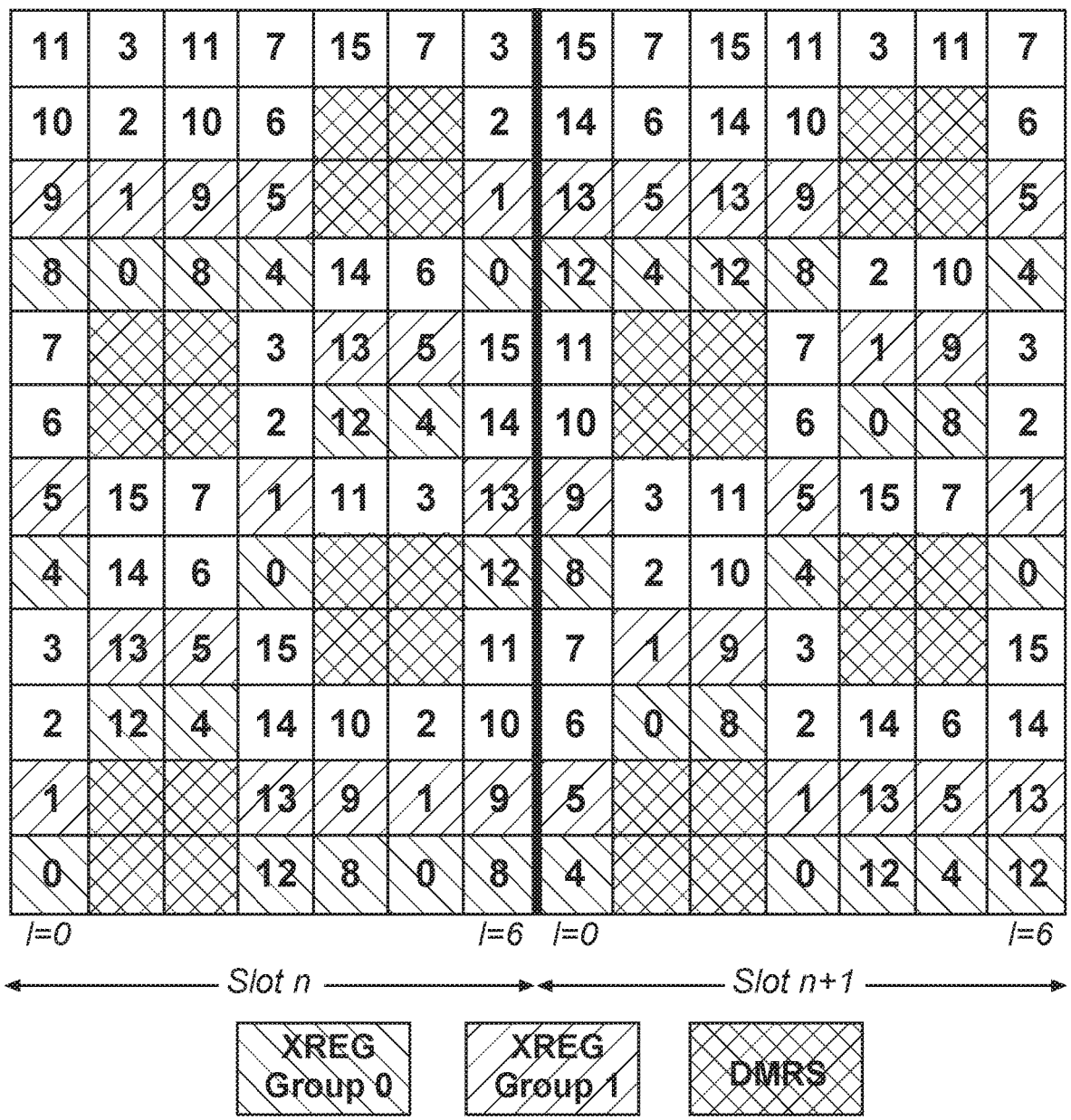
FIG. 10 illustrates resource mapping for the second example DM-RS pattern in accordance with various embodiments.

In another example, the DM-RS pattern for xPDCCH may be similar to cell-specific RS, by which a transmit diversity MIMO mode may be used. In at least these examples, the xPDCCH with common messages may have improved performance because several UEs may need to receive common messages at the same time. FIG. 10 illustrates resource mapping for this DM-RS pattern in accordance with various embodiments. In this example, the xREG and xREG group can follow similar patterns and design principles as described above with reference to FIG. 8, and xREG groups can be defined similarly as described above. Similar principles can be extended and applied for other DM-RS patterns.

Unlike other available control channels (e.g., ePDCCH) which use per-RE cyclic beamforming, in the design of xPDCCH according to various embodiments, per-PRB pair beamforming can be applied to allow frequency dependent scheduling. When the aggregation level is greater than 4, a single antenna port is associated with transmission of xPDCCH in one PRB. Alternatively, some embodiments can apply the same precoder for 2 antenna ports within one PRB to improve the channel estimation performance.

For embodiments in which xPDCCH and xPDSCH are TDM, (FIGS. 6A and 6B), xPDCCH spans the first K OFDM symbols and occupies the full system bandwidth. FIGS. 11A-11D and 12A-12E illustrate the examples of potential DM-RS patterns for xPDCCH transmission in accordance with various embodiments with K=2. In FIGS. 11A-11D, the DM-RS overhead is ⅔, ½, ⅓ and ¼, respectively. Note that in the examples as shown herein, DM-RS positions for the first and second OFDM symbols are different. However, embodiments are not limited thereto and embodiments can include examples in which the DM-RS positions are the same across multiple OFDM symbols.

At least because analog beamforming can be applied for the transmission of xPDCCH, some systems in accordance with various embodiments can multiplex multiple users in a TDM, FDM or spatial-division multiplexing (SDM) manner or a
combination of the above. Further, different users may be allocated with different amounts of resources depending on channel conditions or other factors. In one multiplexing scheme (e.g., SDM), xPDCCH for two different UEs can be transmitted in the same OFDM symbol and at full system bandwidth, but separated using different beamforming weights. In a second multiplexing scheme (e.g., FDM), the xPDCCH for two different users can be transmitted in the same OFDM symbol and with the same beamforming weight, but separated using different REs. In yet another multiplexing scheme (e.g., TDM), the xPDCCH for two different users can be transmitted in different OFDM symbols, using the same or different beamforming weights and resources. However, it will be appreciated that embodiments are not limited to these combinations of multiplexing.

Figure 11B:
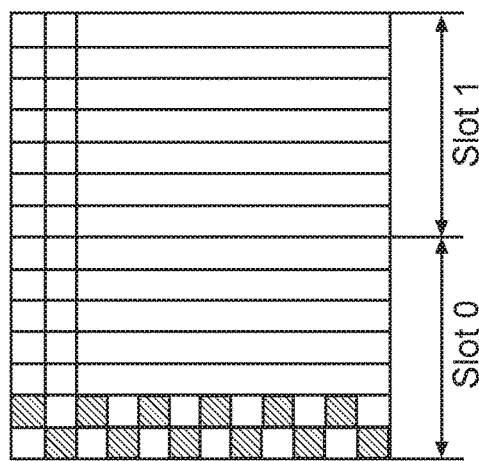
FIGS. 11A-11D illustrate TDM-based DM-RS patterns in accordance with various embodiments.
Figure 11D:
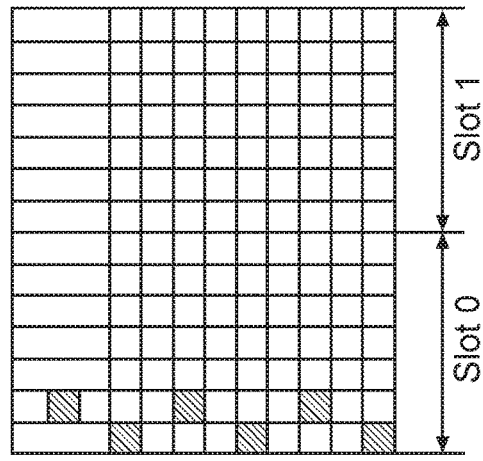
Figure 11A:
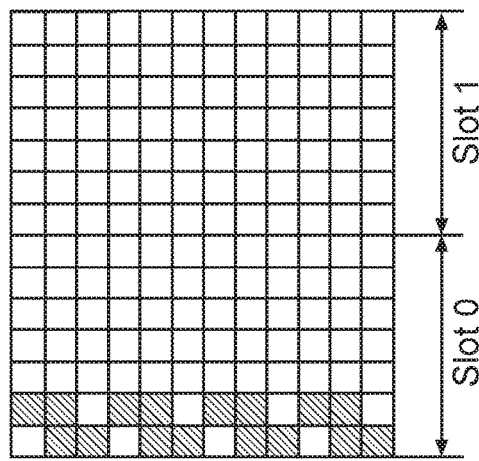
Figure 11C:
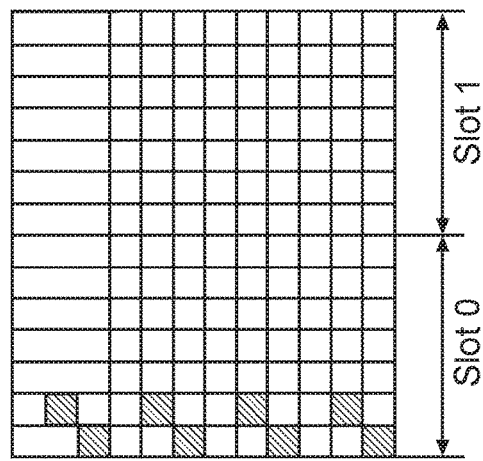

In one embodiment, xPDCCH resource mapping may follow the design principle for PDCCH. This option may be suitable for the DM-RS pattern in which 4 REs may form one xREG as defined for PDCCH resource mapping. In another embodiment, different numbers of REs may form one xREG depending on the DM-RS pattern. For instance, for the DM-RS pattern as shown in FIG. 11D, 6 REs may be group in one xREG. Then one xCCE may occupy 6 xREGs so that the total number of REs for one xCCE is 36.

To facilitate the MU-MIMO for the transmission of xPDCCH, antenna ports for different users may be derived as a function of C-RNTI for the localized transmission mode. Further, the scrambling seed for the DM-RS sequence can be configured in a UE-specific manner. When configured with different scrambling seeds, DM-RS sequences for two UEs can be orthogonal, thereby enabling the MUMIMO for the transmission of xPDCCH.

Apparatuses for Performing Various Embodiments

Figure 13:
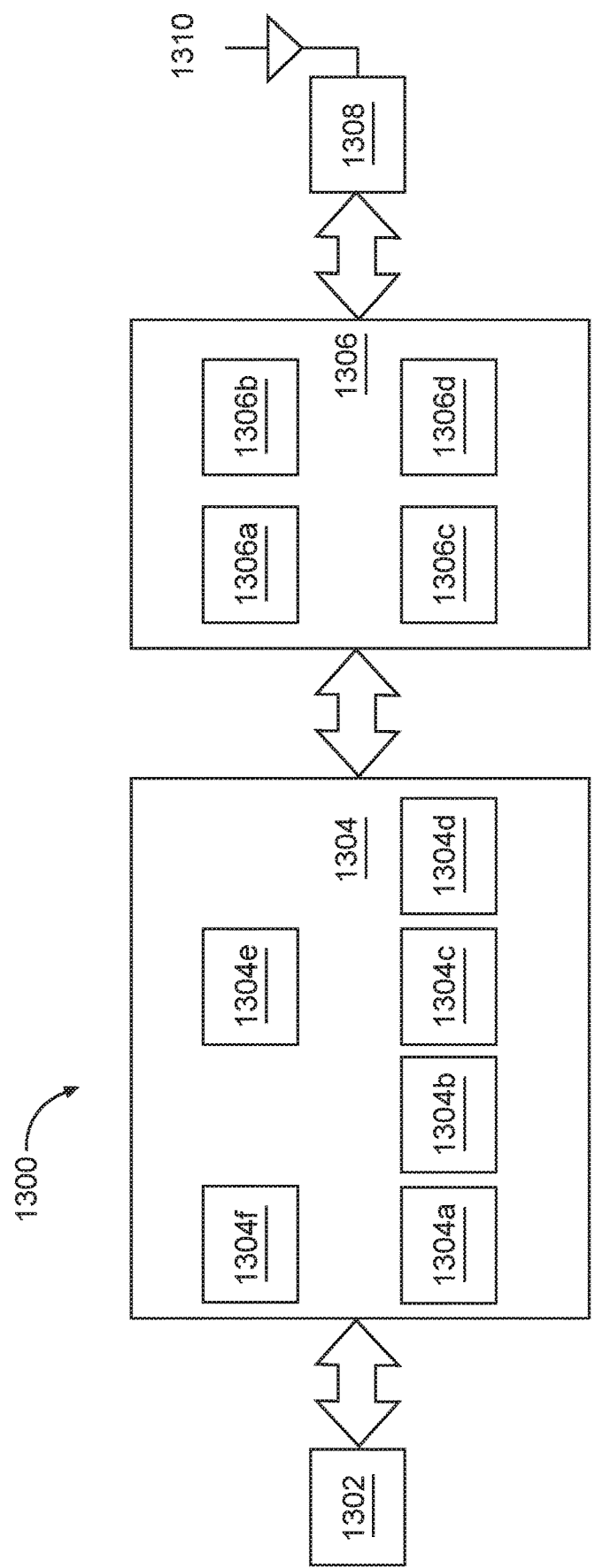
FIG. 13 is a functional diagram of a User Equipment (UE) in accordance with some embodiments.

FIG. 13 is a functional diagram of a User Equipment (UE) 1300 in accordance with some embodiments. The UE 1300 may be suitable for use as a UE 102 as depicted in FIG. 1. In some embodiments, the UE 1300 may include application circuitry 1302, baseband circuitry 1304, Radio Frequency (RF) circuitry 1306, front-end module (FEM) circuitry 1308 and one or more antennas 1310, coupled together at least as shown. In some embodiments, other circuitry or arrangements may include one or more elements and/or components of the application circuitry 1302, the baseband circuitry 1304, the RF circuitry 1306 and/or the FEM circuitry 1308, and may also include other elements and/or components in some cases. As an example, "processing circuitry" may include one or more elements and/or components, some or all of which may be included in the application circuitry 1302 and/or the baseband circuitry 1304. As another example, "transceiver circuitry" may include one or more elements and/or components, some or all of which may be included in the RF circuitry 1306 and/or the FEM circuitry 1308. These examples are not limiting, however, as the processing circuitry and/or the transceiver circuitry may also include other elements and/or components in some cases.

In embodiments, the processing circuitry can configure the transceiver circuitry to receive a control channel (e.g., PDCCH, ePDCCH, xPDCCH, etc.), from an eNB (e.g., eNB 104, FIG. 1), occupying an initial number of orthogonal frequency division multiplexing (OFDM) symbols of a downlink subframe. As described earlier herein, this initial number (e.g., "K"), is less than or equal to the number of OFDM symbols in the downlink subframe. The value for K can be received from the eNB in a MIB or SIB or through RRC signaling as described earlier herein. In some embodiments, the control channel can occupy greater than three, or greater than four, initial OFDM symbols in a subframe. In some embodiments, the control channel can occupy all OFDM symbols of a downlink slot at a frequency or set of frequencies. In at least these embodiments, the downlink shared channel can be FDM with the control channel. In some embodiments, the downlink shared channel can occupy all OFDM symbols of a downlink slot at a frequency or set of frequencies of a resource block. In at least these embodiments, resources allocated to the downlink shared channel can at least partially overlap resources allocated for the control channel.

The control channel can occupy fewer than N PRBs of a system bandwidth comprised of N PRBs. Alternatively, in at least some embodiments, the control channel can occupy all N PRBs of a system bandwidth comprised of N PRBs. The transceiver circuitry can receive information from the eNB 104 indicating at least one PRB index for at least one PRB in which the control channel information is to be received. In embodiments, the control channel can occupy two or more sets of PRBs within the system bandwidth.

The processing circuitry can configure the transceiver circuitry to receive other channels such as a downlink shared channel (e.g., PDSCH) from the eNB 104. The downlink shared channel can be TDM with the control channel. The downlink shared channel can additionally or alternatively be FDM with the control channel. The processing circuitry can process the control channel and the downlink shared channel according to any methods or criteria described in standards for wireless communication.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband circuitry 1304 may interface with the application circuitry 1302 for generation and processing of the baseband signals and for controlling operations of the RF circuitry 1306. For example, in some embodiments, the baseband circuitry 1304 may include a second generation (2G) baseband processor 1304*a*, third generation (3G) baseband processor 1304*b*, fourth generation (4G) baseband processor 1304*c*, and/or other baseband processor(s) 1304*d* for other existing generations, generations in development or to be developed in the future (e.g., fifth generation (5G), 6G, etc.). The baseband circuitry 1304 (e.g., one or more of baseband processors 1304*a-d*) may handle various radio control functions that enable communication with one or more radio networks via the RF circuitry 1306. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1304*e* of the baseband circuitry 1304 may be configured to run elements of the protocol stack for signaling of the PHY, MAC, RLC, PDCP and/or RRC layers. In some embodiments, the baseband circuitry may include one or more audio digital signal processor(s) (DSP) 1304*f*. The audio DSP(s) 1304*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the RF circuitry 1306 may include a receive signal path and a transmit signal path. The receive signal path of the RF circuitry 1306 may include mixer circuitry 1306*a*, amplifier circuitry 1306*b* and filter circuitry 1306*c*. The transmit signal path of the RF circuitry 1306 may include filter circuitry 1306*c* and mixer circuitry 1306*a*. RF circuitry 1306 may also include synthesizer circuitry 1306*d* for synthesizing a frequency for use by the mixer circuitry 1306*a* of the receive signal path and the transmit signal path. In some embodiments, the mixer circuitry 1306*a* of the receive signal path may be configured to down-convert RF signals received from the FEM circuitry 1308 based on the synthesized frequency provided by synthesizer circuitry 1306*d*. The amplifier circuitry 1306*b* may be configured to amplify the down-converted signals and the filter circuitry 1306*c* may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306*a* of the receive signal path may comprise passive mixers, although the scope of the embodiments is not limited in this respect. In some embodiments, the mixer circuitry 1306*a* of the transmit signal path may be configured to up-convert input baseband signals based on the synthesized frequency provided by the synthesizer circuitry 1306*d* to generate RF output signals for the FEM circuitry 1308. The baseband signals may be provided by the baseband circuitry 1304 and may be filtered by filter circuitry 1306*c*. The filter circuitry 1306*c* may include a low-pass filter (LPF), although the scope of the embodiments is not limited in this respect.

In some embodiments, the mixer circuitry 1306*a* of the receive signal path and the mixer circuitry 1306*a* of the transmit signal path may include two or more mixers and may be arranged for quadrature downconversion and/or upconversion respectively. In some embodiments, the mixer circuitry 1306*a* of the receive signal path and the mixer circuitry 1306*a* of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and/or direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306. In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider. The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer. In some embodiments, frequency input may be provided by a voltage controlled oscillator (VCO), although that is not a requirement. Divider control input may be provided by either the baseband circuitry 1304 or the application circuitry 1302 depending on the desired output frequency. In some embodiments, a divider control input (e.g., N) may be determined from a look-up table based on a channel indicated by the application circuitry 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310. In some embodiments, the UE 1300 may include additional elements such as, for example, memory/storage, display, camera, sensor, and/or input/output (I/O) interface.

Figure 14:
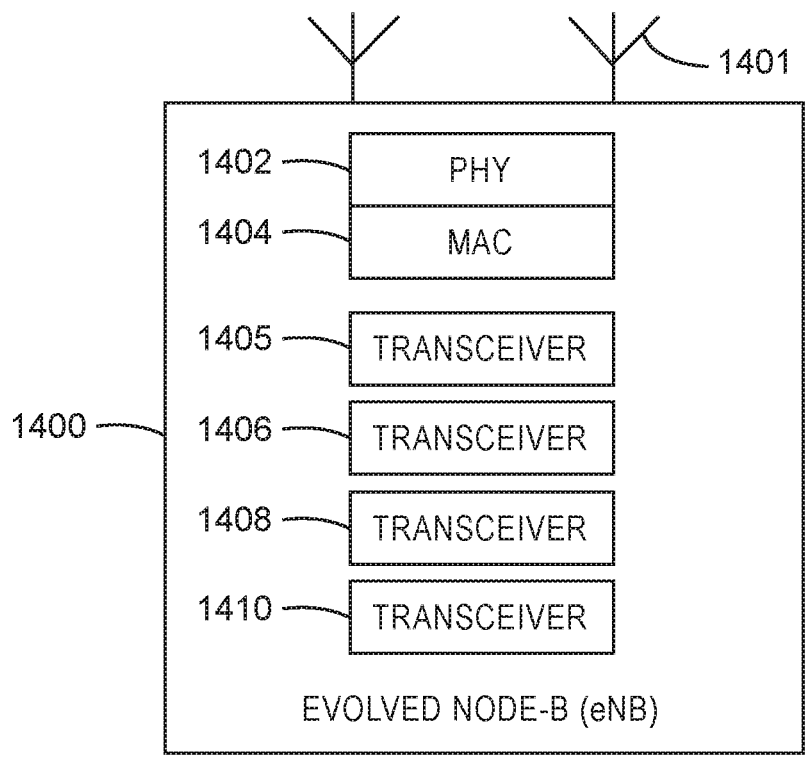
FIG. 14 is a functional diagram of an Evolved Node-B (eNB) in accordance with some embodiments.

FIG. 14 is a functional diagram of an Evolved Node-B (eNB) 1400 in accordance with some embodiments. It should be noted that in some embodiments, the eNB 1400 may be a stationary non-mobile device. The eNB 1400 may be suitable for use as an eNB 104 as depicted in FIG. 1. The eNB 1400 may include physical layer circuitry 1402 and a transceiver 1405, one or both of which may enable transmission and reception of signals to and from the UE 1300, other eNBs, other UEs or other devices using one or more antennas 1401. As an example, the physical layer circuitry 1402 may perform various encoding and decoding functions that may include formation of baseband signals for transmission and decoding of received signals. As another example, the transceiver 1405 may perform various transmission and reception functions such as conversion of signals between a baseband range and a Radio Frequency (RF) range. Accordingly, the physical layer circuitry 1402 and the transceiver 1405 may be separate components or may be part of a combined component. In addition, some of the functionality described may be performed by a combination that may include one, any or all of the physical layer circuitry 1402, the transceiver 1405, and other components or layers. In some embodiments, the transceiver 1405 can transmit, to a first UE (e.g., UE 102, FIG. 1), a control channel occupying an initial number of OFDM symbols of a downlink subframe. A value for the initial number of OFDM symbols can be signaled to the UE in one or more of a MIB or SIB, or within RRC signaling, or within a PCFICH, by way of nonlimiting example.

The transceiver 1405 can transmit a downlink shared channel to the first UE, wherein the downlink shared channel is time division multiplexed (TDM) with the control channel. The transceiver 1405 can then transmit the control channel to a second UE. In some embodiments, the transceiver 1405 can transmit the control channel to the first UE and to the second UE on the same OFDM symbol using a full system bandwidth and different beamforming weights. In some embodiments, the transceiver 1405 can transmit the control channel to the first UE and to the second UE on the same OFDM symbol and with same beamforming weight in a FDM fashion using different REs.

The eNB 1400 may also include medium access control layer (MAC) circuitry 1404 for controlling access to the wireless medium. The eNB 1400 may also include processing circuitry 1406 and memory 1408 arranged to perform the operations described herein. The eNB 1400 may also include one or more interfaces 1410, which may enable communication with other components, including other eNBs 104 (FIG. 1), components in the EPC 120 (FIG. 1) or other network components. In addition, the interfaces 1410 may enable communication with other components that may not be shown in FIG. 1, including components external to the network. The interfaces 1410 may be wired or wireless or a combination thereof.

The antennas 1310, 1401 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1310, 1401 may be effectively separated to take advantage of spatial diversity and the different channel characteristics that may result.

In some embodiments, the UE 1300 or the eNB 1400 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 1300 or eNB 1400 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 1300, eNB 1400 or other device may include one or more of a keyboard, a display, a non-volatile memory port, multiple antennas, a graphics processor, an application processor, speakers, and other mobile device elements. The display may be an LCD screen including a touch screen.

Figure 15:
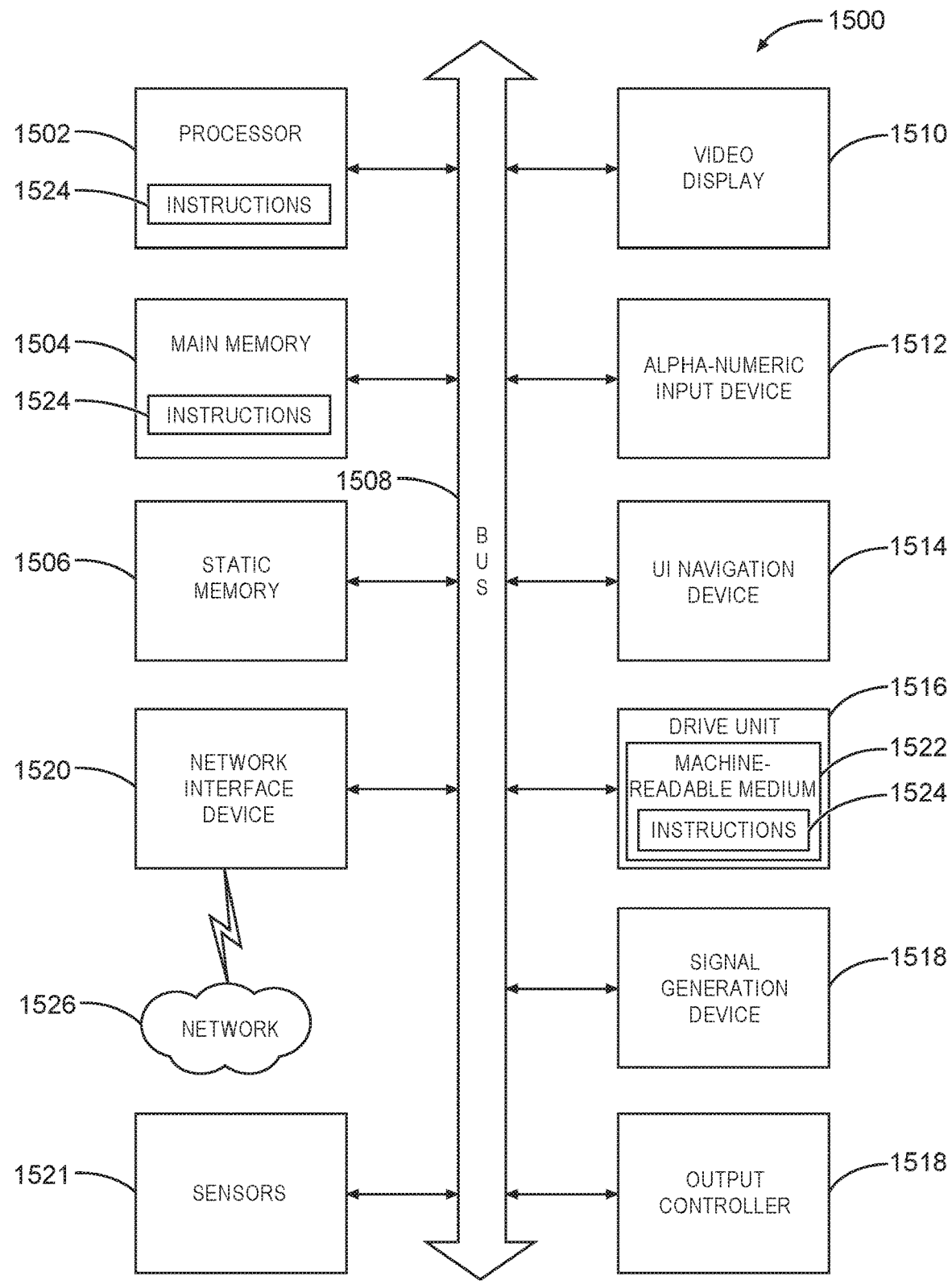
FIG. 15 is a block diagram illustrating components of a machine, according to some example embodiments, able to read instructions from a machine-readable medium and perform any one or more of the methodologies discussed herein, according to aspects of the disclosure.

FIG. 15 illustrates a block diagram of an example machine 1500 upon which any one or more of the techniques (e.g., methodologies) discussed herein may perform. In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a UE, eNB, MME, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1508. The machine 1500 may further include a display unit 1510, an alphanumeric input device 1512 (e.g., a keyboard), and a user interface (UI) navigation device 1514 (e.g., a mouse). In an example, the display unit 1510, input device 1512 and UI navigation device 1514 may be a touch screen display. The machine 1500 may additionally include a storage device (e.g., drive unit) 1516, a signal generation device 1518 (e.g., a speaker), a network interface device 1520, and one or more sensors 1521, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the hardware processor 1502 during execution thereof by the machine 1500. In an example, one or any combination of the hardware processor 1502, the main memory 1504, the static memory 1506, or the storage device 1516 may constitute machine readable media.

While the machine readable medium 1522 is illustrated as a single medium, the term "machine readable medium" may include a single medium or multiple media (e.g., a centralized or distributed database, and/or associated caches and servers) configured to store the one or more instructions 1524. When the machine 1500 operates as a UE, the machine readable medium 1522 can instruct one or more processors of the UE to receive, from an eNB, configuration information indicating a number of OFDM symbols of a downlink subframe that are to include a control channel; detect the control channel in subsequent downlink transmissions from the eNB, starting at an initial OFDM symbol for the downlink subframe; detect a downlink shared channel at a subsequent OFDM symbol of the downlink subframe, the subsequent OFDM symbol having been determined based on the configuration information; and process the control channel and the downlink shared channel.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1524 may further be transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. In some examples, the network interface device 1520 may wirelessly communicate using Multiple User MIMO techniques. The term "transmission medium" shall be taken to include any intangible medium that is capable of storing, encoding or carrying instructions for execution by the machine 1500, and includes digital or analog communications signals or other intangible medium to facilitate communication of such software.

To better illustrate the apparatuses, systems, and methods disclosed herein, a non-limiting list of examples is provided herein:

In Example 1, an apparatus for a User Equipment (UE), the apparatus comprising transceiver circuitry and hardware processing circuitry, the hardware processing circuitry to configure the transceiver circuitry to: receive a control channel, from an Evolved Node-B (eNB), occupying an initial number of orthogonal frequency division multiplexing (OFDM) symbols of a downlink subframe, wherein the initial number is less than or equal to a number of OFDM symbols in the downlink subframe; receive a downlink shared channel from the eNB; and process the control channel and the downlink shared channel.

In Example 2, the subject matter of Example 1 can optionally include wherein the downlink shared channel is time division multiplexed (TDM) with the control channel such that at least a portion of the downlink shared channel is within a same transmission time interval (TTI) as the control channel.

In Example 3, the subject matter of any of Examples 1-2 can optionally include wherein the control channel occupies fewer physical resource blocks (PRBs) than are in a system bandwidth.

In Example 4, the subject matter of any of Examples 1-3 can optionally include wherein the downlink shared channel is additionally frequency division multiplexed (FDM) with the control channel.

In Example 5, the subject matter of any of Examples 1-3 can optionally include wherein the hardware processing circuitry is further to configure the transceiver circuitry to receive information from the eNB indicating at least a value for the initial number of OFDM symbols.

In Example 6, the subject matter of Example 5 can optionally include wherein the information is received in a master information block (MIB) or a system information block (SIB).

In Example 7, the subject matter of Example 5 can optionally include wherein the information is received in UE-specific radio resource control (RRC) signaling.

In Example 8, the subject matter of any of Examples 1-3 can optionally include wherein the hardware processing circuitry is further to configure the transceiver circuitry to receive information from the eNB indicating at least one PRB index for at least one PRB in which control channel information is to be received, wherein the information further includes an indication of whether control channel transmission is to be in a distributed mode or a localized mode.

In Example 9, the subject matter of Example 3 can optionally include wherein the control channel occupies all OFDM symbols of a downlink slot at a frequency or set of frequencies; and the downlink shared channel is frequency division multiplexed (FDM) with the control channel.

In Example 10, the subject matter of Example 3 can optionally include wherein the downlink shared channel occupies all OFDM symbols of a downlink slot at a frequency or set of frequencies of a resource block.

In Example 11, the subject matter of any of Examples 1-10 can optionally include wherein resources allocated to the downlink shared channel at least partially overlap resources allocated for the control channel.

In Example 12, the subject matter of any of Examples 1-11 can optionally include wherein the control channel occupies all physical resource blocks (PRBs) of a system bandwidth.

In Example 13, the subject matter of Example 12 can optionally include wherein resources allocated to the downlink shared channel at least partially overlap resources allocated for the control channel.

In Example 14, the subject matter of any of Examples 1-13 can optionally include wherein the control channel occupies two or more sets of physical resource blocks (PRBs) within a system bandwidth.

In Example 15, a computer-readable storage medium may stores instructions for execution by one or more processors to perform operations for communication by a User Equipment (UE), the operations to configure the one or more processors to receive, from an Evolved Node-B (eNB), configuration information indicating a number of orthogonal frequency division multiplexing (OFDM) symbols of a downlink subframe that are to include a control channel; detect the control channel in subsequent downlink transmissions from the eNB, starting at an initial OFDM symbol for the downlink subframe; detect a downlink shared channel at a subsequent OFDM symbol of the downlink subframe, the subsequent OFDM symbol having been determined based on the configuration information; and process the control channel and the downlink shared channel.

In Example 16, the subject matter of Example 15 can optionally include instructions to receive a subframe bitmap from the eNB, the subframe bitmap indicating which subframes of a downlink frame are to include the control channel, wherein the control channel occupies less than a full system bandwidth; and detect the control channel in subframes indicated in the subframe bitmap and refrain from detecting the control channel in other subframes not indicated in the subframe bitmap.

In Example 17, the subject matter of any of Examples 15-16 can optionally wherein the control channel is time division multiplexed (TDM) with the downlink shared channel.

In Example 18, the subject matter of Example 17 can optionally include wherein the control channel is further frequency division multiplexed (FDM) with the downlink shared channel.

Example 19 includes an apparatus for an Evolved Node-B (eNB), the apparatus comprising hardware processing circuitry and transceiver circuitry, the hardware processing circuitry to configure the transceiver circuitry to transmit, to a first user equipment (UE), a control channel occupying an initial number of orthogonal frequency division multiplexing (OFDM) symbols of a downlink subframe, wherein the control channel occupies less than N physical resource blocks (PRBs) of a system bandwidth comprised of N PRBs; transmit a downlink shared channel to the first UE, wherein the downlink shared channel is time division multiplexed (TDM) with the control channel; and transmit the control channel to a second UE.

In Example 20, the subject matter of Example 19 can optionally include wherein the transceiver circuitry is further configured to transmit the control channel to the first UE and to the second UE on the same OFDM symbol using a full system bandwidth and different beamforming weights.

In Example 21, the subject matter of any of Examples 19-20 can optionally include wherein the transceiver circuitry is further configured to transmit the control channel to the first UE and to the second UE on the same OFDM symbol and with same beamforming weight in a frequency-division multiplexing (FDM) fashion using different resource elements (REs).

In Example 22, the subject matter of any of Examples 19-21 can optionally include wherein the hardware processing circuitry is further to configure the transceiver circuitry to transmit a value for the initial number of OFDM symbols in one of a mater information block (MIB), a system information block (SIB), UE-specific radio resource control (RRC) signaling, and a Physical Control Format Indicator Channel (PCFICH).

In Example 23, the subject matter of any of Examples 19-22 can optionally include wherein the control channel occupies all OFDM symbols of a downlink slot at a frequency or set of frequencies; and the downlink shared channel is FDM with the control channel.

In Example 24, the subject matter of any of Examples 19-23 can optionally include wherein the control channel occupies N physical resource blocks (PRBs) of a system bandwidth comprised of N PRBs.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

What is claimed is:

1. An apparatus for a User Equipment (UE), the apparatus comprising: processing circuitry; and memory,
wherein the processing circuitry is configured to:
receive, from an Evolved Node-B (eNB), configuration information indicating a number of first K orthogonal frequency division multiplexing (OFDM) symbols of a downlink subframe that are to include a physical downlink control channel (PDCCH), the PDCCH having a maximum duration of three OFDM symbols and is to start at a symbol of a slot of the downlink subframe based on a physical resource block (PRB) starting index;
receive information from the eNB indicating at least a value for K;
detect the PDCCH in subsequent downlink transmissions from the eNB, starting at an initial OFDM symbol for the downlink subframe;
detect a downlink shared channel at a subsequent OFDM symbol of the downlink subframe, the subsequent OFDM symbol having been determined based on the configuration information; and
process the PDCCH and the downlink shared channel, wherein the PDCCH is time-division multiplexed (TDM) with the downlink shared channel, and wherein the downlink shared channel is detected in a same downlink subframe as the PDCCH, and wherein the PDCCH occupies fewer physical resource blocks (PRBs) than a system bandwidth and is locatable at predetermined off-center locations of the system bandwidth, the predetermined off-center locations being a same location in each downlink subframe and configured by the configuration information.

2. A non-transitory machine readable medium that stores instructions for execution by one or more processors to perform operations for communication by a User Equipment (UE), the operations to configure the one or more processors to:

receive, from an Evolved Node-B (eNB), configuration information indicating a number of first K orthogonal frequency division multiplexing (OFDM) symbols of a downlink subframe that are to include a physical downlink control channel (PDCCH), the PDCCH having a maximum duration of three OFDM symbols and is to start at a symbol of a slot of the downlink subframe based on a physical resource block (PRB) starting index;

receive information from the eNB indicating at least a value for K;

detect the PDCCH in subsequent downlink transmissions from the eNB, starting at an initial OFDM symbol for the downlink subframe;

detect a downlink shared channel at a subsequent OFDM symbol of the downlink subframe, the subsequent OFDM symbol having been determined based on the configuration information; and process the PDCCH and the downlink shared channel, wherein the PDCCH is time-division multiplexed (TDM) with the downlink shared channel, and wherein the downlink shared channel is detected in a same downlink subframe as the PDCCH, and wherein the PDCCH occupies fewer physical resource blocks (PRBs) than a system bandwidth and is locatable at predetermined off-center locations of the system bandwidth, the predetermined off-center locations being a same location in each downlink subframe and configured by the configuration information.

3. An apparatus for an evolved Node B (eNB), the apparatus comprising: processing circuitry; and memory, wherein the processing circuitry is configured to:

encode for transmission to a user equipment (UE) configuration information indicating a number of first K orthogonal frequency division multiplexing (OFDM) symbols of a downlink subframe that are to include a physical downlink control channel (PDCCH), the PDCCH having a maximum duration of three OFDM symbols and is to start at a symbol of a slot of the downlink subframe based on a physical resource block (PRB) starting index;

encode for transmission to the UE information indicating at least a value for K;

encode the PDCCH for transmission in subsequent downlink transmissions to the UE, starting at an initial OFDM symbol for the downlink subframe; and encode for transmission to the UE a downlink shared channel at a subsequent OFDM symbol of the downlink subframe, a location of the subsequent OFDM symbol based on the configuration information; and wherein the PDCCH is time-division multiplexed (TDM) with the downlink shared channel, wherein the downlink shared channel is encoded for transmission to the UE in a same downlink subframe as the PDCCH, and wherein the PDCCH occupies fewer physical resource blocks (PRBs) than a system bandwidth and is locatable at predetermined off-center locations of the system bandwidth, the predetermined off-center locations being a same location in each downlink subframe and configured by the configuration information.

* * * * *